2 Sheets—Sheet 1.
G. C. WINSLOW.
Harrow and Cultivator Tooth.
No. 234,639. Patented Nov. 16, 1880.
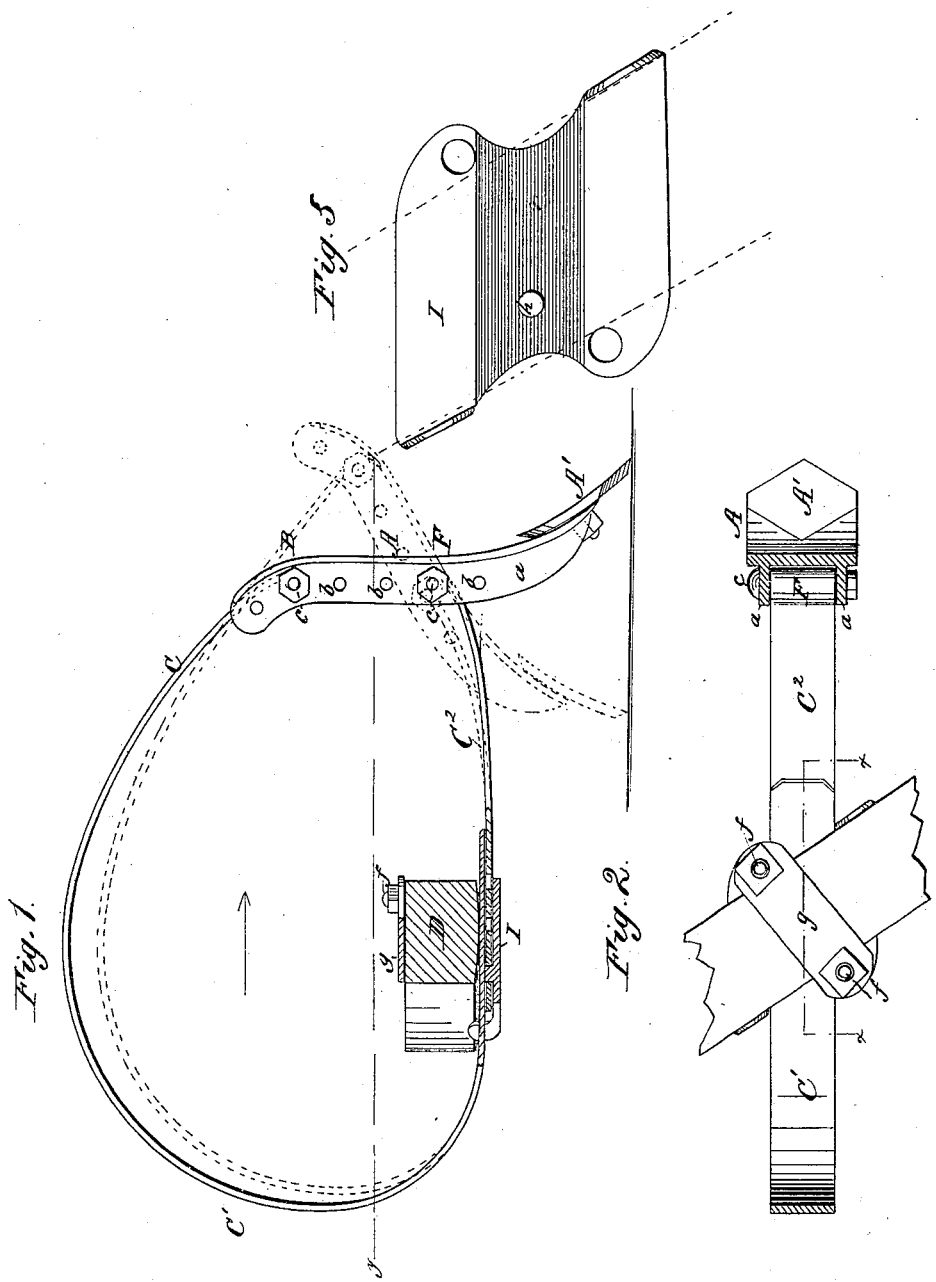
WITNESSES:
W. W. Hollingsworth
Edw. W. Byrn
INVENTOR:
Geo. C. Winslow,
BY
ATTORNEYS.

2 Sheets—Sheet 2
G. C. WINSLOW.
Harrow and Cultivator Tooth.
No. 234,639. Patented Nov. 16, 1880.
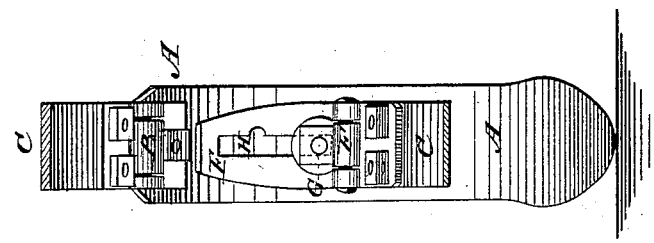
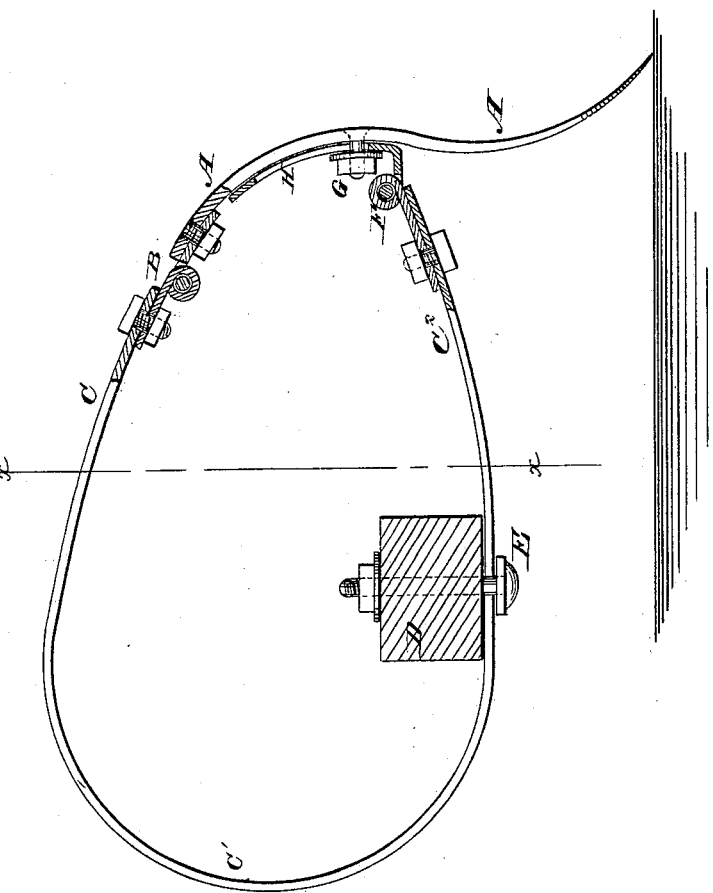
WITNESSES:
Francis McArdle
Edw. W. Byrn
INVENTOR:
Geo. C. Winslow
BY 
ATTORNEYS.

UNITED STATES PATENT OFFICE.

GEORGE C. WINSLOW, OF KALAMAZOO, MICHIGAN.

HARROW AND CULTIVATOR TOOTH.

SPECIFICATION forming part of Letters Patent No. 234,639, dated November 16, 1880.

Application filed November 29, 1879.

*To all whom it may concern:*

Be it known that I, GEORGE C. WINSLOW, of the village and county of Kalamazoo and State of Michigan, have invented a new and Improved Harrow and Cultivator Tooth; and I do hereby declare that the following is a full, clear, and exact description of the same, reference being had to the accompanying drawings, forming part of this specification, in which—

Figure 1 is a side view of the tooth and spring, with the parts in section where they connect with the frame-bar. Fig. 2 is a horizontal section through the line $y\ y$ of Fig. 1, looking downwardly. Fig. 3 is a side view, and Fig. 4 a vertical section through line $x\ x$, of a modified construction. Fig. 5 is a detail of the clip-plate drawn on a large scale.

My invention relates to certain improvements in teeth for harrows or cultivators, and it has reference more particularly to that class of teeth which are made yielding to adapt them to ride over obstructions without breakage.

The object of my invention is to provide a tooth which is not only yielding to obstructions, but one capable of adjustment for greater or less tension, as well as adjustable to greater or less depth and inclination.

The invention consists, first, in the combination of a bent or C-shaped spring and a harrow-tooth having its middle jointed to one of the ends of the spring and the other end of the spring jointed to the upper end of the tooth; secondly, in the combination, with the frame-bar, of the C-shaped spring clamped to said bar and having its ends extended forward of its point of attachment, and a tooth jointed to the two ends of the spring, substantially as described; thirdly, in the combination of a spring bent around, over, and to the front of its point of attachment to the bar, and a detachable tooth connected to said spring and extending to the earth in a curve continuous with the curve of the spring on its front side, to permit grass and trash to pass over; fourthly, in constructing the shank of the harrow-tooth with long perforated flanges $a\ a$, to receive the ends of the springs, give a range of adjustment, and act as strengthening ribs or braces to the shank, and combining them with the forward ends of the springs by bolts; fifthly, in the combination, with the harrow-tooth, of the C-shaped spring jointed at its forward ends to the tooth, as described, and made in two sections adapted to be adjusted upon each other; sixthly, in the combination, with the springs, made in two sections, lapped, and provided with adjusting-holes, of a clip-plate having a longitudinal channel and stud, together with bolts and cross-plates for connecting the ends of the springs and fastening the spring to the bar, all as hereinafter more fully described.

In the drawings, A represents the tooth, $C\ C'\ C^2$ the C-shaped spring, and D one of the bars, of the harrow or cultivator, to which the spring is rigidly attached.

The lower branch of the C-shaped spring is clamped to the bar D, (preferably upon its under side,) and the upper branch extends with a semicircular bend over the said bar D to a position in front of the said bar and more or less above the lower end of the spring. To the lower end of the spring at F is jointed the tooth A, upon which joint said tooth fulcrums when it yields to obstructions, while the upper end of the tooth and upper end of the spring are jointed at B, so that the tension of the upper part of said spring applied at this point tends to hold the top end of the tooth back and the lower end or point forward.

In carrying out this part of my invention I may construct the parts either as shown in Figs. 1 and 2 or in Figs. 3 and 4. In the first case the tooth is made with a separate point, A', and shank-piece A, the shank-piece being cast of malleable iron with two rearwardly-projecting flanges or ribs, $a\ a$, which are perforated laterally with a series of holes, $b$. These flanges $a\ a$ are so spaced on the rear side of the shank that they exactly receive and fit beside the ends of the spring C, which latter are fastened to the shank by bolts $c\ c$ passing through the holes in the flanges $a\ a$ and through the tubular or bent ends of the spring. These flanges serve several useful purposes. The first and most important function is to connect adjustably the tooth-shank and the spring, so that either the fulcrum or point where the spring-tension is applied may be changed and the tooth thus given greater or less tension by the change in leverage; secondly, they hold the ends of the spring against lateral displacement; and, thirdly, they form strengthening-ribs for the shank, so that the latter can be made very strong and light out of malleable cast-iron.

In spacing the flanges $a$ they are placed a short distance inside of the outer edges of the shank, so that both heads and nuts are protected from wear and clogging by the said projecting edges of the shank, as shown in Fig. 3.

For superior construction and ease of adjustment, I prefer the means just described for connecting the tooth and the spring; but I may construct and connect these parts as shown in Figs. 3 and 4. In this case a slotted plate, H, extends upwardly from the joint F, and to the same the tooth A is fastened by a nut and bolt, G, passing through the slot, while the upper end of the tooth is jointed at B to the upper end of the spring. Now, by adjusting the bolt and nut G up or down in the slot in the plate H the distance between the fulcrum F and the upper joint, B, is varied, and by changing the leverage of the tooth A the same result of a variable tension is secured.

The object in extending the ends of the spring forward of the point of attachment at D is twofold. In the first place, the foot forms a continuous curve from the upper bend of the spring to the ground, and any grass, straw, or accumulation which may gather on the tooth, instead of finding permanent lodgment thereon, after a while passes entirely over the top of the spring with an unimpeded passage. In the second place, the lower horizontal end, $C^2$, of the spring, which carries the fulcrum, by reason of its elasticity between the bar D and the foot, permits a vertical play of the foot, which co-operates with its other yielding movement to make it pass more readily over the obstruction.

In constructing the spring C, I may make it in a single piece, as shown in Fig. 3, in which case it is clamped to the frame D by one or more bolts, E. I prefer, however, to make C C' in one piece and $C^2$ separate from the other portion, as shown in Fig. 1. In such case I cause the two sections to overlap each other just beneath bar D, and fasten them both rigidly to the bar D by a clip-plate, I, having bolts $f f$ and diagonal cross-plate $g$ on the opposite side. In constructing this clip-plate it is made with suitable holding-lugs for the opposite side of the bar D, and has in its face next the bar D a longitudinal recess, $r$, (see Fig. 5,) just wide enough to receive the lapped ends of the spring-sections.

To hold the lower section, $C^2$, of the spring against slipping out longitudinally, a short stud, $h$, is formed in the recess of the clip, which fits into any one of a series of holes in the confined end of the said section $C^2$ of the spring.

The object of making the spring in sections and connecting them by the stud and holes, as described, it will be seen, is to permit the section $C^2$ to be moved longitudinally back or forth, to shift the fulcrum of the tooth, and thus alter the inclination of the tooth to the earth. It also permits the lower section of the spring to be taken out and turned upside down, which, by reason of the curve of section $C^2$, would throw the tooth deeper into the earth.

The lower end of the upper section may be also extended in front of the bar D and above the lower section, $C^2$, so as to strengthen or re-enforce the latter against upward strain.

For giving a further vertical adjustment of the tooth without changing the position of the spring-section $C^2$, which it may not be convenient to do when the harrow is at work in the field, I make the harrow-bars D with a rounded underneath surface, as in Fig. 1, so that when one of the clip-bolts is loosened and the other tightened the spring will rock in a vertical plane and the tooth will be made to run a little deeper or little shallower, as may be required.

Having thus described my invention, what I claim as new is—

1. The combination of a bent or C-shaped spring and a harrow-tooth having its middle jointed to one of the ends of the spring and the other end of the spring jointed to the upper end of the tooth, as and for the purpose described.

2. The combination, with the frame-bar, of a C-shaped spring clamped to said bar and having its ends extended forward of the same, and a tooth jointed to the two ends of the spring, substantially as described.

3. The combination of a spring, bent around, over, and to the front of its point of attachment to the bar, and a detachable tooth connected to said spring and extending to the earth in a curve continuous with the curve of the spring on its front side, substantially as described, to permit obstructions to pass over the same.

4. The shank A of the harrow-tooth, having rearwardly-projecting and perforated flanges $a$ $a$, combined with and jointed to the forward ends of the spring by bolts, as described.

5. The combination, with the harrow-tooth, of the C-shaped spring, jointed at its forward ends to the tooth, as described, and made in two sections, C C' and $C^2$, adapted for adjustment the one upon the other, as described.

6. The combination, with the spring, made in two sections, lapped beneath the bar D, and having adjusting-holes in the rear end of the shorter section, of a clip-plate having a longitudinal channel and stud, together with the bolts and cross-plate for connecting the ends of the spring and fastening the spring to the bar, as described.

The above specification of my invention signed by me this 28th day of November, 1879.

GEORGE C. WINSLOW.

Witnesses:
　EDWD. W. BYRN,
　CHAS. A. PETTIT.